POWER & COYNE.

Railroad Freight-Car.

No. 87,002.

Patented Feb. 16, 1869.

Witnesses:

Inventors.

BENJAMIN P. POWER AND JOHN COYNE, OF BALTIMORE, MARYLAND.

Letters Patent No. 87,002, dated February 16, 1869.

IMPROVED RAILWAY-CAR.

The Schedule referred to in these Letters Patent and making part of the same.

*To all whom it may concern:*

Be it known that we, BENJAMIN P. POWER and JOHN COYNE, of the city and county of Baltimore, and State of Maryland, have invented a new and useful Improvement in the Construction of Railway-Cars; and we do hereby declare that the following is a full, clear, and exact description of the construction and operation of the same, reference being had to the accompanying drawings, making a part of this specification, in which—

Figure 1:
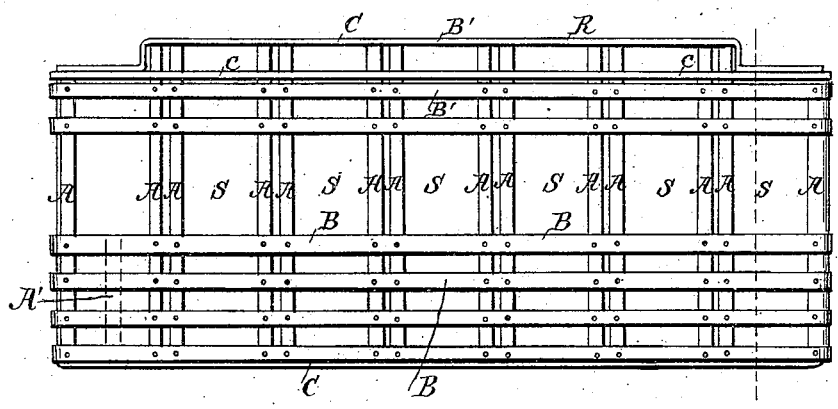

Figure 1 is a side elevation, and

Figure 2:
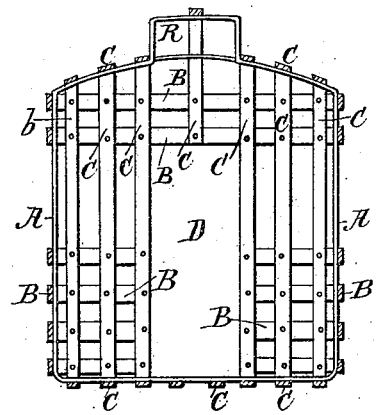

Figure 2, a transverse section, showing the construction of the skeleton or frame of the car.

The object of this invention is to obtain a railway-car which cannot be easily crushed or destroyed by running off of the track, or set on fire by any accident. To this end, The invention consists in constructing the car of metal strips extending transversely around it, in a plane perpendicular to its longer axis, and connected together by a series of longitudinal strips, of similar material, bolted or riveted to the transverse strips, the proper apertures being left for the doors, windows, &c., and the whole covered and lined with India rubber, gutta-percha, or other similar material, as hereinafter set forth.

In the drawings—

A A' are metallic strips extending around the car in vertical planes transverse to its longer axis;

B B are others, extending also around the car, but in vertical planes parallel to such axis; and C C are others still, also passing around the car, but in horizontal planes parallel to such axis, and perpendicular to the planes of the strips B B.

In general, we would have the transverse strips A A' inside, the strips B B, C C, passing over them, as the planks of a ship extend along across its ribs.

The strips that pass the sides of the car-windows, as shown at A A, may be made of double size and strength, or two may be employed together, so as to give sufficient strength to the car, and yet leave suitable spaces, *s s,* for the windows.

When the strength of the strips at the sides of the windows is thus doubled, the strip A' may be omitted; otherwise it must be retained.

The top of the car may be formed, as shown at R, by bending the strips at that point in the proper manner.

Spaces D D are left at the ends of the cars for the doors.

The frame or skeleton thus constructed is then to be covered, as shown at M, with India rubber, gutta-percha, or other suitable flexible material, to a great degree indestructible by the action of fire, and not of a nature to splinter and be thrown violently in fragments by the concussion of a collision or other accident.

In ceiling and furnishing the interior of the car, we would employ similar material, such as a metallic, rubber, or gutta-percha floor, rubber or gutta-percha seats, ceiling, &c., so that in the event of the car's being thrown from the track, there would be little danger of its destruction by fire.

A car thus constructed can be easily made as light as a wooden car of the same size, and at as little cost.

Its advantages, in case of collision and other accidents, are too obvious to need enumeration.

We may, however, mention as some of its ordinary advantages, not confined to time of accident, the entire exclusion of wood or other material of a decomposing or inflammable character, the great elasticity, toughness, and strength of the materials employed, which conduce greatly to the durability of the car, as well as to the security and comfort of the passengers, and the superior finish which can be given to the interior of the car by the use of hard rubber.

Having thus described our invention,

What we claim as new, and desire to secure by Letters Patent, is—

A railway-car, constructed with a metallic frame, covered and lined with gutta-percha or India rubber, substantially as and for the purpose specified.

The above specification of our improvement in the construction of railway-cars, signed by us, this 18th day of September, 1868.

BENJ. P. POWER.
JOHN COYNE.

Witnesses:
C. A. PETTIT,
F. C. BEACH.